United States Patent [19]

Roe et al.

[11] Patent Number: 4,700,149

[45] Date of Patent: Oct. 13, 1987

[54] MATCHING BEAM MODULATORS

[75] Inventors: Malcolm D. M. Roe; Michael E. Hicks, both of Herts, England

[73] Assignee: Crosfield Electronics (USA) Limited, London, England

[21] Appl. No.: 776,718

[22] Filed: Sep. 16, 1985

[30] Foreign Application Priority Data

Nov. 5, 1984 [GB] United Kingdom ............... 8427912

[51] Int. Cl.⁴ .............................................. H01S 3/00
[52] U.S. Cl. ................................... 332/7.51; 346/108
[58] Field of Search ................. 332/7.51; 372/26, 29, 372/31; 358/298, 302; 348/108, 160

[56] References Cited

U.S. PATENT DOCUMENTS

| | | | |
|---|---|---|---|
| 3,708,797 | 1/1973 | Solomon et al. | 332/7.51 X |
| 3,725,574 | 4/1973 | Gast | 358/298 |
| 3,780,296 | 12/1973 | Waksberg et al. | 372/31 X |
| 3,787,887 | 1/1974 | Burton | 332/7.51 X |
| 3,898,583 | 8/1975 | Shuey | 372/26 X |
| 4,009,385 | 2/1977 | Sell | 332/7.51 X |
| 4,068,197 | 1/1978 | Yamazaki et al. | 372/26 X |
| 4,072,858 | 2/1978 | Stone | 372/31 X |
| 4,093,964 | 6/1978 | Aughton | 358/298 X |
| 4,460,249 | 7/1984 | Vincent | 332/7.51 X |

OTHER PUBLICATIONS

Laser Modulation Control Method, Roshon, Jr., IBM Technical Disclosure Bulletin, vol. 12, No. 3, 8/69.

Primary Examiner—Thomas H. Tarcza
Assistant Examiner—Mark Hellner
Attorney, Agent, or Firm—Sughrue, Mion, Zinn, Macpeak and Seas

[57] ABSTRACT

A method and apparatus for matching the transmission characteristics of two beam modulators (4,4') comprises radiation generating means (30); and the first and second beam modulators (4,4'), the radiation generating means causing beams of radiation (16,16') to impinge on each modulator. Control means (20) generates first and second control functions for application to the first and second modulators (4,4') respectively, the first control function cyclically varying between first upper and lower values ($V_1, V_2$) and the second control function cyclically varying between second upper and lower values ($V_3, V_4$) at the same rate and at the same time as the first control function, the range of the first and second control functions being such that the transmission characteristics of the first and second beam modulators overlap. Detecting means (18,19) detects the phase relationship between the radiation transmitted by the first and second beam modulators and having the higher or lower intensity and the first or second control function; and storage means (32) stores the second upper value ($V_3$) when the detecting means determines a change in the phase relationship.

9 Claims, 5 Drawing Figures

MATCHING BEAM MODULATORS

FIELD OF THE INVENTION the invention relates to methods and apparatus for matching the transmission characteristics of beam modulators, particularly beam modulators for use in an image generation system.

BACKGROUND OF THE INVENTION

In conventional image generation systems, an original image is scanned to generate signals representing for example cyan, magenta, and yellow which, after processing, are fed to an exposing beam assembly which generates one or more exposing beams which are modulated in accordance with the scanned signals. The exposing beams impinge on a record medium which may be a light sensitive sheet or gravure cylinder. In the case of half-tone imaging, the control information is modified with half-tone dot information. Typically, the intensity of an exposing beam is controlled by a beam modulator.

In this context, a modulator comprises a device for controlling the transmission of radiation passing through the modulator in accordance with an applied control function. Such a modulator is hereinafter referred to as of the kind described. The response characteristic of the modulator to the control function commonly but not always exhibits a maximum or minimum. Typically, the response characteristic will be 'U' or 'V'-shaped and conveniently is symmetrical about hthe maximum or minimum. In this context 'maximum' refers to maximum radiation transmission and 'minimum' to minimum transmission or extinction. It should also be understood that "maximum" and "minimum" transmission relates to transmission in a particular direction since typical beam modulators cause incoming beams partially or wholly to deflect or diffract through angles determined in accordance with the applied control function.

A typical beam modulator of the kind described comprises an electro-optical modulator which responds to an applied voltage. Typically, the response characteristic has a $\sin^2$ form, that is the intensity of light transmitted varies in a $\sin^2$ fashion in response to applied voltage.

In some cases, the response characteristic of conventional modulators is not constant and tends to vary and, in some cases, drift over fairly short time periods and due to temperature variations. Typical drifts are in the order of tens of volts. Where a number of such modulators are mounted together, such as in the Crosfield Magnascan 645 system, variations greater than about 2 volts in response characteristics can lead to the generation of moire patterns in some colour separations which is undesirable. More commonly, optical components upstream of the modulators cause variations in the beams incident on the modulators and these variations can be compensated for by adjusting the transmission characters of the modulators.

In our earlier U.S. patent application Ser. No. 727,325 we described methods and apparatus for determining for each beam modulator the position of beam extinction or maximum beam transmission. Although these methods are satisfactory they are carried out on each modulator individually and in general the response characteristic between beam extinction and maximum beam transmission is not the same for each modulator.

In the past manual balancing of the beam modulators has been carried out. This is a time consuming procedure and is not accurate since it relies on the skill of the field engineer.

SUMMARY OF THE INVENTION

In accordance with one aspect of the present invention, a method of matching the transmission characteristics of two beam modulators of the kind described comprises:

(a) applying a first control function to a reference modulator, the first control function cyclically varying between first upper and lower values;

(b) applying a second control function to a test beam modulator, the second control function cyclically varying between second upper and lower values at the same rate and at the same time as the first control function, the range of the first and second control functions being such that the transmission characteristics of the modulators overlap;

(c) monitoring beams transmitted through the modulators;

(d) detecting the phase relationship between the transmitted radiation having the higher or lower intensity and the first or second control function; and (e) changing the second upper value, and repeating steps (a) to (d) for each second upper value to determine the second upper value at which the monitored phase relationship changes.

The invention provides an automatic method for locating one or more positions (that is the value of a control function which must be applied) at which the intensity of radiation transmitted through the modulators is substantially the same. For example, if the second upper value is initially greater than the first upper value then the intensity of the beam transmitted through the test modulator will in general be greater than the intensity of the beam transmitted through the first modulator and will thus constitute the higher intensity radiation. If the phase relationship between the first control function and the higher intensity radiation is detected then initially they will be out of phase. As the second upper value is decreased the intensity of the beam transmitted through the test modulator will gradually decrease until it becomes the same as and then less than the intensity of the beam transmitted through the reference modulator. At this point, the beam with the higher intensity will be that transmitted through the reference modulator and this will be in phase with the first control function. Thus, at the point where a change of phase occurs the intensity of the two beams is substantially the same and a balance point has been found.

Typically, the first and second control functions will be in antiphase although with the use of a suitable bias the control functions could be in phase.

Preferably, the method further comprises repeating steps (a) to (e) with different magnitudes of the first upper value. In this way, a range of balance points are determined.

Once at least two matching or balance points have been found others may be generated mathematically in a known manner.

It should be noted that this invention can be used for matching modulators which do not have a U or V shaped response characteristic.

Where more than two beam modulators of the kind described are provided, for example in image generation systems, the method may further comprise determining which beam modulator transmits the lowest intensity radiation when set to transmit maximum intensity, this modulator being designated as the reference modulator, and thereafter carrying out methods in accordance with the invention with each of the other beam modulators constituting the test beam modulator in turn.

The step of determining maximum beam transmission may be achieved manually in a conventional manner or by using any of the methods set out in our earlier U.S. patent application Ser. No. 727,325. Where the beam modulators are provided in an image generation system, the modulators may first be fed with a predetermined maximum control function so that in this case the true maximum transmission point of each modulator may not be compared but only the maximum point achievable in response to the available control function.

In the case of an electro-optical beam modulator, the control functions will comprise applied voltages.

Preferably, the cyclic form of the control functions is a square wave.

Conveniently, the first and second lower values of the first and second control functions respectively comprise values of the control functions which correspond to beam extinction for respective modulators. These lower values may initially be determined using conventional methods or methods as described in our earlier U.S. patent application Ser. No. 727,325.

As will be appreciated, the invention is particularly applicable to image generation systems such as the Crosfield Magnascan system in which six beam modulators are arranged side by side to generate a corresponding number of exposing beams. Conveniently, before each image is scanned onto a record medium, beam extinction and maximum beam transmission for each modulator is determined using manual or automatic means and then the modulators are matched using methods in accordance with this invention.

In accordance with a second aspect of the present invention, a modulator assembly comprises radiation generating means; first and second beam modulators of the kind described, the radiation generating means causing beams of radiation to impinge on each modulator; control means for generating first and second control functions for application to the first and second modulators respectively, the first upper and lower values and the varying between first upper and lower values and the second control function cyclically varying between second upper and lower values at the same rate and at the same time as the first control function, the range of the first and second control functions being such that the transmission characteristics of the first and second beam modulators overlap; detecting means for detecting the phase relationship between the radiation transmitted by the first and second beam modulators and having the higher or lower intensity and the first or second control function; and storage means for storing the second upper value when the detecting means determines a change in the phase relationship.

Typically, the control means and the detecting means may be provided at least in part by a suitably programmed computer.

Preferably, the detecting means comprises a common detector onto which each of the transmitted beams of radiation impinge. This is particularly advantageous since the detector, which may be a photodetector, provides an output which comprises a constant intensity component and a cyclically varying component related to the cyclic beam of radiation having a higher intensity. Thus, where more than two modulators are passing light beams, the extra modulators will be ignored as will stray light providing it is not oscillating in intensity at the same rate as the control functions.

BRIEF DESCRIPTION OF THE DRAWINGS

An example of an image generation system for carrying out a method and incorporating apparatus in accordance with the present invention will now be described with reference to the accompanying drawings, in which.

DETAILED DESCRIPTION OF THE INVENTION

Figure 1:
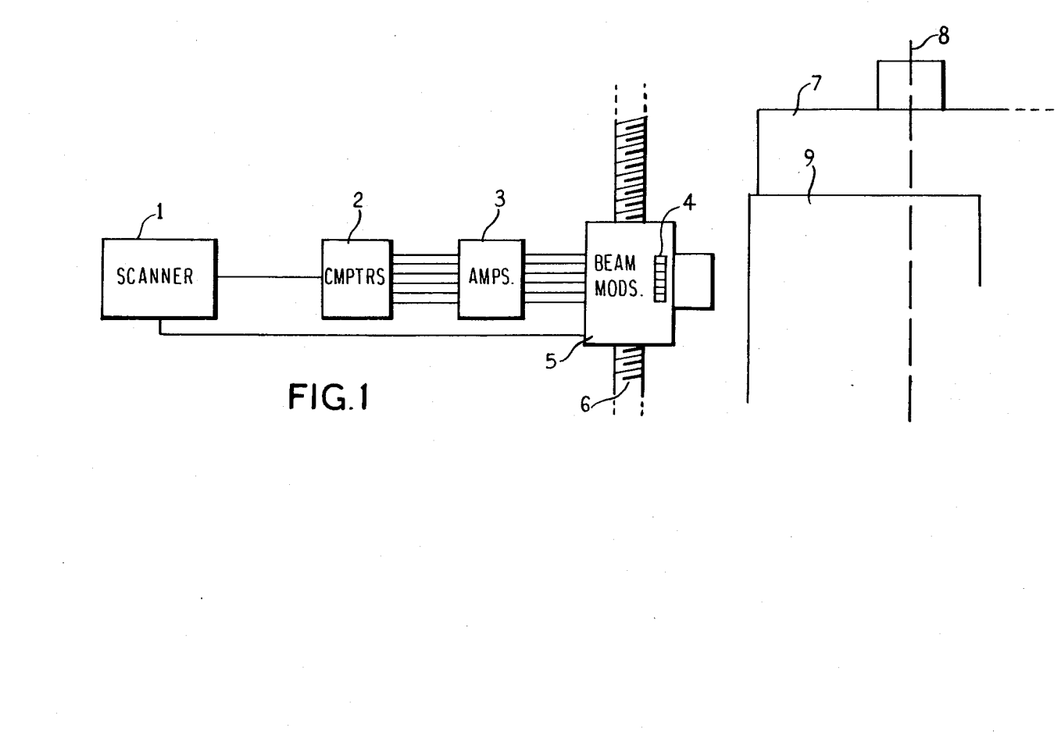
FIG. 1 is a block diagram of the system.

The system illustrated in FIG. 1 comprises an input scanner 1 of conventional form such as provided in our Crosfield Magnascan 645 system. The output from the input scanner 1 comprises control signals for each of a number of colour separations such as cyan, magenta, yellow and black which are fed in turn to six laser beam computers 2. Each laser beam computer 2 actuates via a respective amplifier 3 a laser beam modulator 4. In this system, there are provided six beam modulators 4 arranged side by side which are controlled together by their respective beam computers 2. The modulators 4 are mounted in an exposing head 5 mounted on a lead screw 6. The exposing head 5 is positioned adjacent a cylinder 7 rotatable about an axis 8 and which carries a record medium 9. In use, the cylinder 7 rotates about the axis 8 while the lead screw 6 is rotated at a comparatively low speed so that six laser beams generated from a single laser beam impinging on a beam splitter and controlled by the beam modulators 4 expose successive circumferential strips of the record medium 9.

The beam modulators 4 are controlled by the beam computers 2 so that a half-tone dot representation of an original image scanned by the input scanner 1 is generated in the form of a number of colour separations on the record medium 9, the beam modulators 4 being controlled in response to colour density information supplied by the input scanner 1 and in accordance with half-tone dot information supplied by the beam computers 2.

Typically, the beam modulators 4 are electro-optical modulators controlled by an applied voltage. Examples of typical beam modulators are shown in U.S. Pat. No. 4,025,189 where the modulators comprise an electro-optical material known as PLZT.

Figure 2:
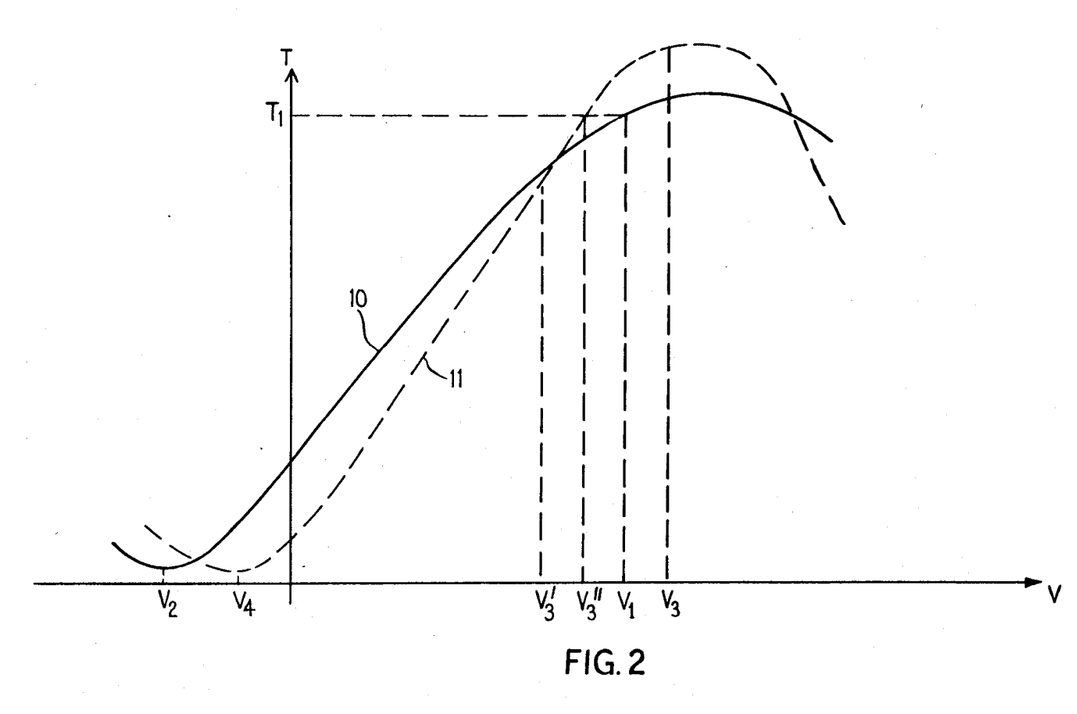
FIG. 2 illustrates the response characteristics of two beam modulators.

The response of a typical beam modulator to an applied voltage is illustrated in FIG. 2 where it will be seen that the transmittance (T) of the modulator varies with applied voltage (V) in the form of a $\sin^2$ function as illustrated by a line 10. Typically, the wavelength of the response characteristic is about 600 V, while the ratio between maximum and minimum transmittance is 200:1.

The response characteristic of a second beam modulator is indicated by a dashed line 11 in FIG. 2. It will be seen that the lines 10, 11 do not coincide. This is mainly due to inaccuracies of the beam splitter but may also indicate that the response of the two beam modulators to applied voltage is different. The modulators must be matched in order that the image generation system is accurate. In addition, the response characteristics tend individually to drift over time which cause a particular problem in maintaining a constant beam extinction position as well as unbalancing previously matched modulators. In the past, compensation for these changes and matching of the modulators has been achieved by applying bias voltages, controlling the gain of the amplifiers 3 and manually determining voltages which must be applied to achieve substantially the same beam transmission intensity, these corrections being carried out by a field engineer. These manual methods are time consuming and inherently inaccurate and the apparatus described with reference to FIGS. 3 and 4 provides a solution to these problems.

Figure 3:
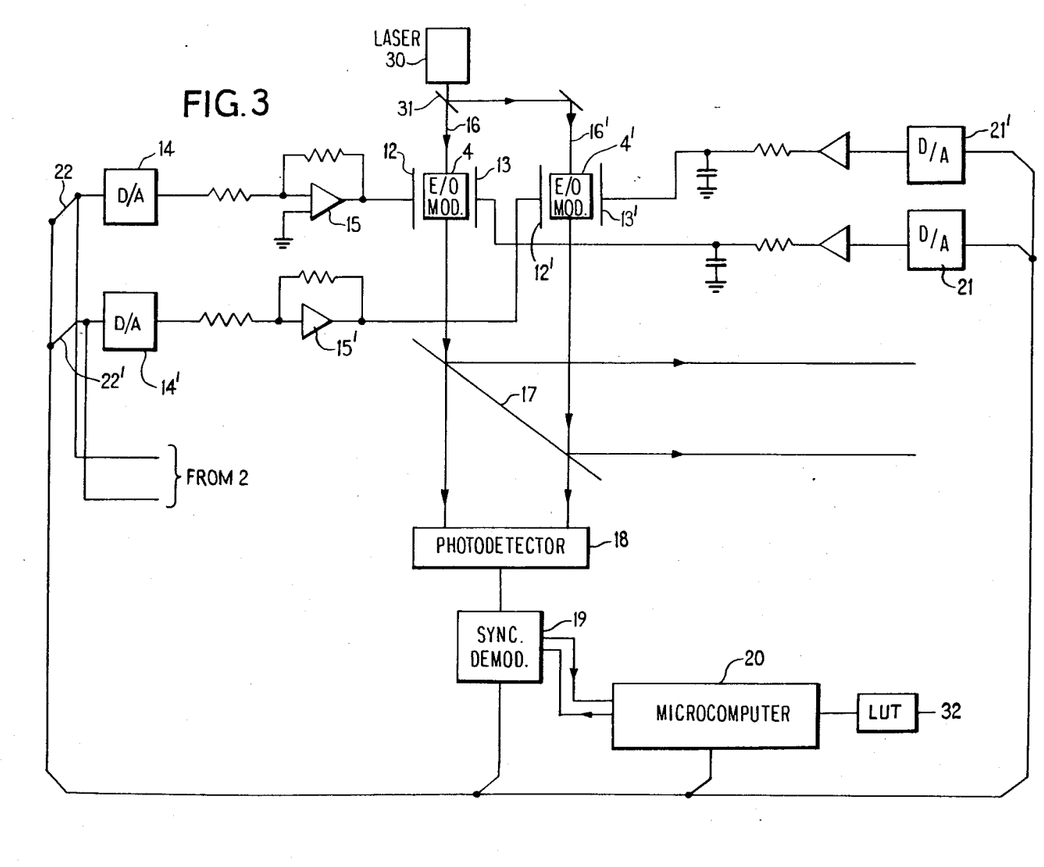
FIG. 3 is a block circuit diagram illustrating two beam modulators and their controlling electronics in more detail.

FIG. 3 illustrates the apparatus in more detail. A pair of electro-optical modulators 4, 4' are controlled by respective pairs of electrodes 12, 13; 12',13'. The beam computers 2 apply individual control signals to a pair of D/A converters 14, 14' which pass corresponding analogue voltage signals via amplifiers 15, 15' (part of the amplifiers 3) to the electrodes 12, 12' respectively. The control signals from the beam computers 2 vary in such a way as to define a half-tone dot of the correct size for the colour separation in question at the particular pixel being exposed.

A laser beam from a laser 30 is split by a conventional beam splitter 31 into six separate subsidiary beams two of which 16, 16' are shown in FIG. 3. The beams 16, 16' pass through respective modulators 4, 4' and impinge on a semi-silvered mirror 17 where they are partially reflected towards the record medium 9 (not shown in FIG. 3). Non-reflected portions of the laser beams 16, 16' pass through the mirror 17 and are received by a common photodetector 18. The photodetecor 18 may comprise a photodiode such as a Centronic OSD50-5 connected to an operational amplifier such as a National Semiconductor Corporation (NSC) LF356. The output from the photodetector 18 which is a signal proportional to the intensity received by the detector 18 is fed to a synchronous demodulator 19 of conventional form. A microcomputer (MPU) 20 such as a 6809 is provided to feed digital bias signals to a pair of D/A converters 21, 21' (such as Precision Monolithics Inc DAC08) whose analogue output comprises a bias voltage fed to the electrodes 13, 13'. In addition, the microcomputer 20 generates digital test control functions (to be described below) which are fed to the D/A converters 14, 14' and to the synchronous demodulator 19. The microcomputer 20 controls switches 22, 22' to connect selectively the microcomputer output to the D/A converters 14,14'.

Figure 4:
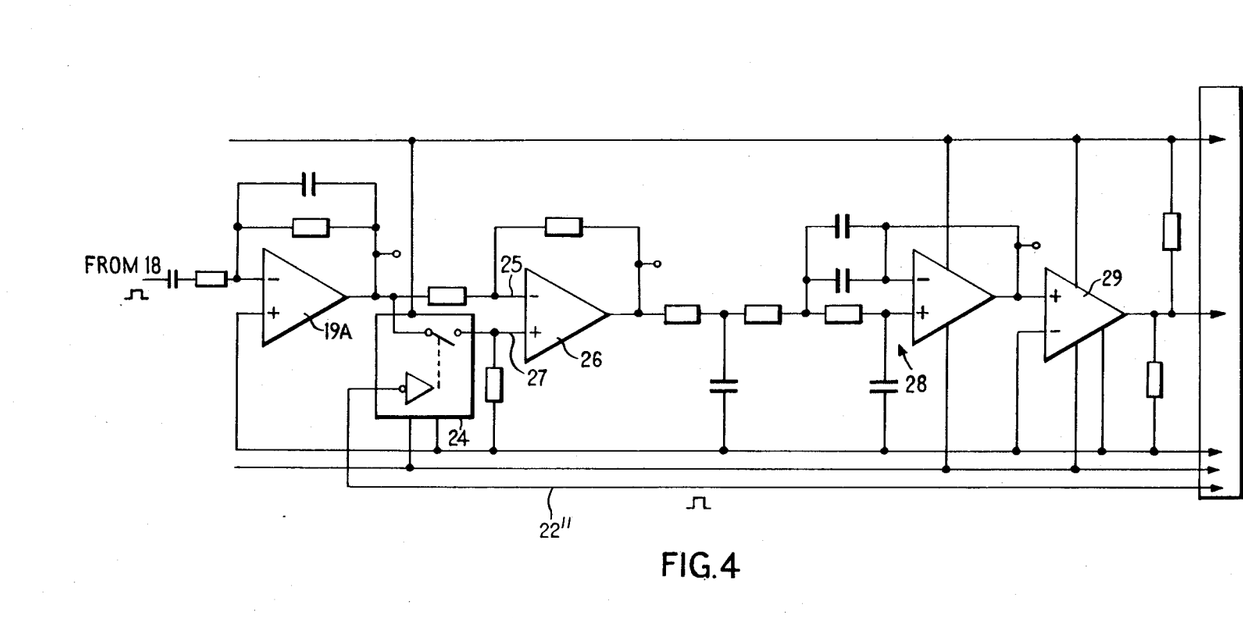
FIG. 4 illustrates in more detail the synchronous demodulator shown in FIG. 3; and, FIGS. 5A–5C are waveform diagrams.

The synchronous demodulator 19 is shown in more detail in FIG. 4 and comprises a conventional integrated switch 24 whose position is controlled by the square wave supplied by the MPU 20 along a line 22''. The square wave signal from the detector 18 is fed via an amplifier 19A (such as an NSCLM348) to an inverting input 25 of an operational amplifier 26 (such as an NSCLM348) and via the switch 24 to a non-inverting input 27 of the amplifier 26. The amplifier 26 has a gain of unity and operates as an inverter or non-inverter according to the position of the switch 24. The output from the amplifier 26 is fed through a low pass filter 28 including an amplifier (such as a NSCLM348) to one input of a comparator 29 the other input of which is held at ground potential. The comparator 29 may comprise an NSCLM311N. For the purposes of this explanation, it will be assumed that the output signal from the detector 18 is such that the output from the amplifier 19A varies between +5 volts and −5 volts. When the switch 24 is closed, the amplifier 26, plus its associated resistors, acts as a non-inverting unity gain amplifier; whereas when the switch 24 is open the amplifier 26 acts as a unity gain inverter. If the square wave on the line 22'' is in phase with the signal from the amplifier 19A, the positive halves of the signal will be inverted but the negative halves will not so that the signal from the amplifier 26 will be a steady −5 volts. Alternatively, if the square wave on the line 22'' is in anti-phase with the signal from the amplifier 19A then exactly the opposite arrangement will occur and the signal from the amplifier 26 will be a steady +5 volts. The output signal is fed through the low pass filter 28 to deal with noise and the finite switching times of the switch 24 and the amplifier 26. It is then passed to the comparator 29 to give a clean switching signal.

The output from the synchronous demodulator 19 is fed to the MPU 20.

Initially, the bias voltages to be applied to the electrodes 13, 13' are determined. This could be achieved by a manual method but is preferably achieved under the control of the microcomputer 20. The microcomputer 20 causes one of the switches 22, 22' to connect its respective D/A converter 14, 14' to the microcomputer to receive a pair of digital values which are oscillated at a constant rate. These are superimposed on a signal from the respective beam computer 2 representing beam extinction and cause the beam transmitted through the respective modulator 4, 4' to oscillate in intensity. The synchronous demodulator 19 which is fed with the oscillating digital signals from the microcomputer 20 provides an output which is a continuous d.c. voltage signal detected by the microcomputer 20. The sign of this voltage signal indicates whether the voltage applied across the respective beam modulator lies to the left or right of beam extinction and the bias voltage applied to the electrode 13, 13' is then adjusted until beam extinction is achieved. This process is described in more detail in our copending U.S. patent application Ser. No. 727,325.

Once beam extinction has been set, each modulator 4, 4' is set to beam extinction and then for each modulator 4, 4' the voltage corresponding to maximum beam transmission is determined. This may be achieved by manual adjustment or preferably automatically by a method similar to that for locating beam extinction. To achieve this automatically the microcomputer 20 causes one of the switches 22, 22' to connect its respective D/A converter 14, 14' to the microcomputer to receive a pair of digital values which are oscillated at a constant rate. These are superimposed on a signal from the respective beam computer 2 representing maximum beam transmission and cause the beam transmitted through the respective modulator 4, 4' to oscillate in intensity. The synchronous demodulator 19 which is fed with the oscillating digital signals from the microcomputer 20 provides an output which is a continuous d.c. voltage signal detected by the microcomputer 20. The sign of this voltage signal indicates whether the voltage applied across the respective beam modulator lies to the left or right of the maximum possible transmission and a corresponding adjustment is made in the signal from the beam computer 2.

Figure 5:
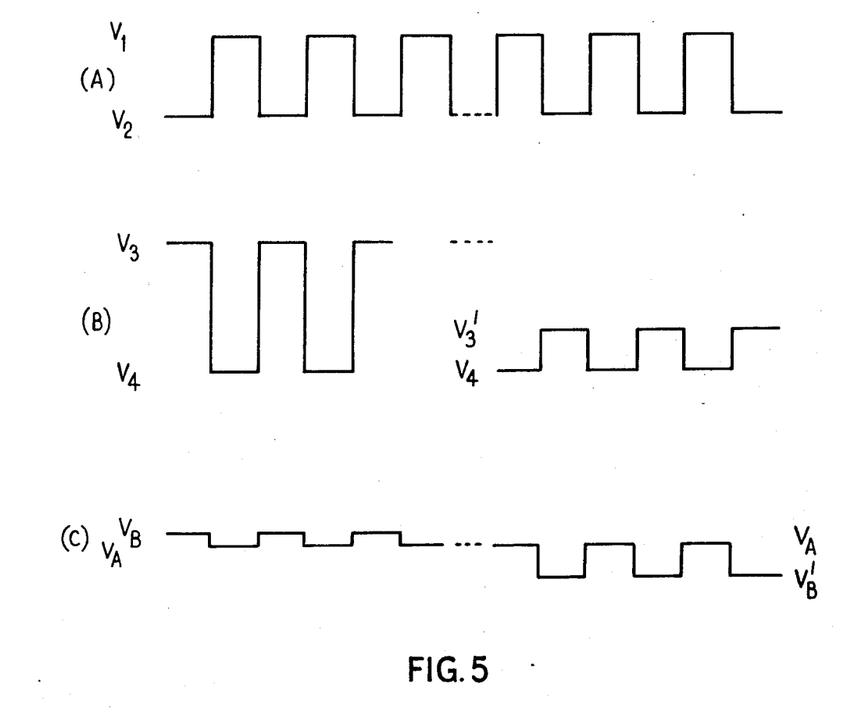

The microcomputer 20 now matches the two beam modulators 4, 4'. Initially, the beam computers 2 are set to beam extinction and the microcomputer 20 feeds a pair of digital values to the D/A converter 14. These values comprise an upper value corresponding to a transmission $T_1$ and a lower value corresponding to beam extinction for that modulator. These values thus correspond to voltages $V_1$ and $V_2$ respectively. For the sake of simplicity, it is assumed that the bias voltage applied to the electrodes 13, 13' is zero. The digital values applied to the D/A converter 14 are applied in a regular square waveform to generate a square wave voltage signal illustrated by FIG. 5A. At the same time, a second pair of digital values are applied by the microcomputer 20 to the D/A converter 14'. These cause a second voltage signal to be applied across the modulator 4' and are chosen so that initially the upper value of the voltage signal causes the modulator 4' to transmit a beam with a higher intensity than that corresponding to $T_1$ while the lower value of the voltage signal corresponds to beam extinction. These voltages $V_3$ and $V_4$ respectively are illustrated in FIG. 2 and the waveform of the voltage signal applied across the modulator 4' is shown on the left in FIG. 5B. It will be seen by comparing FIGS. 5A and 5B that the voltage signals applied across the modulators 4, 4' have the same period but are exactly in antiphase.

The beams 16, 16' transmitted through the modulators 4, 4' are received by the common detector 18 which provides a voltage output which oscillates in accordance with the total intensity incident on the detector 18. This is illustrated by the left hand portion of FIG. 5C where the output is seen to vary between a voltage $V_B$ and $V_A$. This is because when the beam 16 is extinguished the beam 16' is at an intensity corresponding to $V_3$ while when the beam 16' is extinguished the beam 16 is at an intensity corresponding to $V_1$. The synchronous demodulator 19 provides an output which is a d.c. voltage signal detected by the microcomputer 20, the sign of the voltage signal depending upon whether the oscillation of the detector output is in phase or out of phase with the voltage signal applied across the modulator 4. In the present circumstances, the two signals are out of phase.

The voltage $V_3$ is then gradually decreased so that the transmission of the modulator 4' varies along the line 11 until it has crossed the position $T_1$ and $V_3$ is set at $V_3'$. At this position, the voltage signal applied across the modulator 4' has the form shown by the right hand portion of FIG. 5B. This signal is still in antiphase with the signal applied across the modulator 4. However, since the maximum intensity of the beam transmitted through the modulator 4' is now less than that transmitted through the modulator 4 the output from the detector 18 will now have the form shown in the right hand portion of FIG. 5C where the output signal varies between the voltage $V_A$ and a new voltage $V_B'$ corresponding to the applied voltage $V_3'$. This signal fed to the synchronous demodulator 19 is now in phase with the voltage signal applied across the modulator 4 and thus the synchronous demodulator 19 will provide a d.c. output having a different sign from that previously.

The microcomputer 20 monitors this phase relationship and records the value of the voltage $V_3''$ at which the sign of the output from the synchronous demodulator 19 changes. This corresponds to the change in the phase relationship which occurs when the transmission of the modulator 4' is $T_1$.

The microcomputer 20 then selects a new value for $V_1$ and the process is repeated to determine another match point. When all the match points have been determined these are stored in a conventional look-up table 32 to which the beam computers 2 refer before generating control signals.

In the present case, where there are six beam modulators, the process so far described is then repeated by pairing the beam modulator 4 with each of the other beam modulators.

For the intermediate positions between matched points, a conventional mathematical interpolation may be carried out for some types of modulator.

We claim:

1. A method of matching the transmission characteristics of two beam modulators each comprising a device for controlling the transmission of radiation passing through the modulator in accordance with an applied control function, the method comprising
   (a) applying a first control function to one of said modulators constituting a reference modulator, said first control function cyclically varying between first upper and lower values;
   (b) applying a second control function to another of said modulators constituting a test beam modulator, said second control function cyclically varying between second upper and lower values at the same rate and in antiphase with said first control function, the range of said first and second control functions being such that the transmission characteristics of said modulators overlap;
   (c) monitoring the intensity of the beams transmitted through said modulators with a common detector and generating a signal which varies in accordance with the intensity of the radiation incident on said detector;
   (d) detecting the phase relationship between said signal generated by said detector and one of said first and second control functions; and,
   (e) changing said second upper value, and repeating steps (a) to (d) to determine said second upper value at which said monitored phase relationship changes.

2. A method according to claim 1, further comprising repeating said steps (a) to (e) with different magnitudes of said first upper value.

3. A method according to claim 1, for matching the transmission characteristics of more than two beam modulators each comprising a device for controlling the transmission of radiation passing through the modulator in accordance with an applied control function, said method further comprising determining which of said beam modulators transmits the lowest intensity radiation when set to transmit maximum intensity, this said modulator being designated as said reference modulator, and thereafter carrying out steps to e with each of the other beam modulators constituting said test beam modulator in turn.

4. A method according to claim 3, further comprising for each test modulator further comprising repeating said steps (a) to (e) with different magnitudes of said first upper value.

5. A method according to claim 1, wherein said cyclic form of said control functions is a square wave.

6. A method according to claim 1, wherein said first and second lower values of said first and second control functions respectively comprise values of said control functions which correspond to beam extinction for respective modulators.

7. A method according to claim 3, wherein said first and second lower values of said first and second control functions respectively comprises values of said control functions which correspond to beam extinction for respective modulators.

8. A modulator assembly comprising radiation generating means; first and second beam modulators each comprising a device for controlling the transmission of radiation passing through the modulator in accordance with an applied control function, said radiation generating means being adapted to cause beams of radiation to impinge on each modulator; control means for generating first and second control functions for application to said first and second modulators respectively, said first control function cyclically varying between first upper and lower values and said second control function cyclically varying between second upper and lower values at the same rate and in antiphase with said first control function, the range of said first and second control functions being such that the transmission characteristics of said first and second beam modulators overlap; a common detector onto which each of said transmitted beams of radiation impinge and which generates a signal which varies in accordance with the intensity of the radiation incident on said detector; detecting means for detecting the phase relationship between said signal generated by said detector and one of said first and second control functions; and storage means for storing said second upper value when said detecting means determines a change in said phase relationship.

9. An image generation system comprising a source of control signals; a record medium support; and a modulator assembly comprising radiation generating means, and first and second beam modulators each comprising a device for controlling the transmission of radiation passing through the modulator in accordance with an applied control function, said radiation generating means being adapted to cause beams of radiation to impinge on each modulator, said modulators being responsive to said control signals to modulate said beams of radiation, said record medium support and said modulator assembly being movable relatively to each other, wherein said modulator assembly further comprises control means for generating first and second control functions for application to said first and second modulators respectively, said first control function cyclically varying between first upper and lower values and said second control function cyclically varying between second upper and lower values at the same rate and in antiphase with said first control function, the range of said first and second control functions being such that the transmission characteristics of said first and second beam modulators overlap; a common detector onto which each of said transmitted beams of radiation impinge and which generates a signal which varies in accordance with the intensity of the radiation incident on said detector; detecting means for detecting the phase relationship between said signal generated by said detector and one of said first and second control functions; and storage means for storing said second upper value when said detecting means determines a change in said phase relationship.

* * * * *